US012386855B2

United States Patent
M et al.

(10) Patent No.: US 12,386,855 B2
(45) Date of Patent: Aug. 12, 2025

(54) AUTOMATIC SCRIPT GENERATION USING A MULTI-LAYERED INGESTION PROGRAM TO REDUCE RUNTIME ERRORS

(71) Applicant: Bank of America Corporation, Charlotte, NC (US)

(72) Inventors: Anandraj M, Chennai (IN); Matthew Brooks, Charlotte, NC (US); Nidhi Chhabra, Gurugram (IN); Saranya Gopal, Chennai (IN); Vaishali M, Chennai (IN); Ramesh Kumar Ambati, Hyderabad (IN); Sunshine Calderon, Richardson, TX (US); Bhartesh Dhudshia, Allen, TX (US); Bikash Dash, Hyderabad (IN); Rajesh Kongathi, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 64 days.

(21) Appl. No.: 18/203,368

(22) Filed: May 30, 2023

(65) Prior Publication Data
US 2024/0403315 A1    Dec. 5, 2024

(51) Int. Cl.
*G06F 16/27*    (2019.01)
*G06F 16/21*    (2019.01)

(52) U.S. Cl.
CPC ............ *G06F 16/27* (2019.01); *G06F 16/219* (2019.01)

(58) Field of Classification Search
CPC ................................ G06F 16/27; G06F 16/219
See application file for complete search history.

(56) References Cited

U.S. PATENT DOCUMENTS

| 9,959,306 B2 | 5/2018 | Chang et al. |
| 10,127,022 B2 | 11/2018 | Sharma et al. |
| 10,346,358 B2 | 7/2019 | Gorelik |
| 10,642,721 B2 | 5/2020 | Kulkarni et al. |
| 10,657,146 B2 | 5/2020 | Bath et al. |

(Continued)

OTHER PUBLICATIONS

Mangrulkar et al., "Design of Intelligent Applications using Machine Learning and Deep Learning Techniques", Chapman and Hall/CRC (Year: 2021).*

*Primary Examiner* — Charles Rones
*Assistant Examiner* — Huen Wong
(74) *Attorney, Agent, or Firm* — Banner & Witcoff, Ltd.

(57) ABSTRACT

Aspects of the disclosure relate to automatic script generation using a multi-layered ingestion program. An automatic ingestion platform may generate the program. The platform may receive a request to ingest information. The platform may automatically generate a plurality of executable scripts using the program. The plurality of scripts may include at least one script corresponding to a first layer of the program and a plurality of scripts corresponding to a second layer of the program. The platform may identify a subset of information to be ingested based on executing a script corresponding to the first layer. The platform may execute the scripts corresponding to the second layer. Executing the scripts corresponding to the second layer may cause the platform to deploy a schedule management program and transfer the subset of information to a third layer. The platform may cause synchronization of a central information repository with the third layer.

20 Claims, 9 Drawing Sheets

(56) References Cited

U.S. PATENT DOCUMENTS

| | | |
|---|---|---|
| 10,747,571 B2 | 8/2020 | Fuchs |
| 10,805,316 B2 | 10/2020 | Aditham et al. |
| 10,922,489 B2 | 2/2021 | Ray et al. |
| 10,976,907 B2 * | 4/2021 | Stojanovic ........... G06F 16/2379 |
| 11,074,476 B2 * | 7/2021 | Wray ..................... G06F 16/904 |
| 11,178,182 B2 | 11/2021 | Saxena et al. |
| 11,226,964 B1 * | 1/2022 | Cairney ............. G06F 16/24553 |
| 11,281,673 B2 | 3/2022 | Nanda et al. |
| 11,360,950 B2 | 6/2022 | Harrison et al. |
| 11,397,736 B2 * | 7/2022 | Dvinov ................. G06F 16/284 |
| 11,397,744 B2 | 7/2022 | Wan et al. |
| 11,409,764 B2 | 8/2022 | Rehal |
| 11,468,049 B2 * | 10/2022 | Griffith ............... G06F 16/2423 |
| 11,604,804 B2 | 3/2023 | Bapat et al. |
| 2014/0373177 A1 * | 12/2014 | Arning .................. G06F 21/604 |
| | | 726/28 |
| 2017/0337197 A1 * | 11/2017 | Jung ......................... G06N 5/04 |
| 2018/0089289 A1 * | 3/2018 | Zhang ................. G06F 16/9538 |
| 2018/0089312 A1 * | 3/2018 | Pal ........................ G06F 16/335 |
| 2018/0203744 A1 * | 7/2018 | Wiesmaier .............. G06F 9/505 |
| 2018/0302425 A1 * | 10/2018 | Esman, Sr. ............. G06N 20/00 |
| 2019/0171650 A1 | 6/2019 | Botev et al. |
| 2019/0238635 A1 * | 8/2019 | Ng ...................... H04L 67/1095 |
| 2019/0324781 A1 | 10/2019 | Ramamurthy et al. |
| 2020/0019882 A1 | 1/2020 | Garg et al. |
| 2020/0117434 A1 | 4/2020 | Biskup et al. |
| 2023/0153089 A1 | 5/2023 | Bawcom et al. |
| 2023/0161785 A1 | 5/2023 | Bakshan et al. |
| 2023/0367783 A1 * | 11/2023 | Srivastava .......... G06F 16/1858 |

* cited by examiner

AUTOMATIC SCRIPT GENERATION USING A MULTI-LAYERED INGESTION PROGRAM TO REDUCE RUNTIME ERRORS

BACKGROUND

In some instances, a system may use services integration framework (SIF) programs to transfer information (e.g., account information corresponding to a client of an enterprise organization, such as a financial institution and/or other organization) from a regional database to a central repository, such as a data lake. In some examples, transferring the information may require the coordinated use of multiple different software programs configured to perform different tasks in the transfer procedure. Using these different software programs may require an individual (e.g., a software developer at financial institution, and/or other organizations) to generate multiple scripts to perform one or more different tasks in the transfer procedure. Generating each script requires a significant amount of dedicated time from the user and is susceptible to user error at multiple points. In some instances, large amounts of information may require transfer in a short period of time, resulting in the need to generate the scripts multiple times for different subsets of information. In some examples, this may lead to significant runtime errors caused by user error in generating the scripts and may require the expenditure of resources to debug the errors, further slowing the script generation process. Accordingly, it may be important to provide an improved method of generating the scripts necessary to transfer the information to reduce runtime errors.

SUMMARY

Aspects of the disclosure provide effective, efficient, scalable, and convenient technical solutions that address and overcome the technical problems associated with current script generation procedures to facilitate information transfer. In accordance with one or more arrangements of the disclosure, a computing device with at least one processor, a communication interface, and memory storing computer-readable instructions may generate a multi-layered ingestion program. The multi-layered ingestion program may be configured to automatically ingest information from an information management system to a central information repository. The computing platform may receive a query requesting ingestion of information, from the information management system and to the central information repository. The computing platform may automatically generate a plurality of executable scripts, using the multi-layered ingestion program and based on the query. Each executable script of the plurality of executable scripts may correspond to a layer of the multi-layered ingestion program. The plurality of executable scripts may comprise at least one script corresponding to a first layer of the multi-layered ingestion program, and a plurality of scripts corresponding to a second layer of the multi-layered ingestion program. The computing platform may identify a first subset of information stored in the information management system by automatically executing the at least one script corresponding to the first layer. The first subset of information stored in the information management system may comprise information marked for ingestion to the central information repository. The computing platform may execute the plurality of scripts corresponding to the second layer to ingest the first subset of information. Executing the plurality of scripts corresponding to the second layer may cause the computing platform to deploy a schedule management program for the second layer and transfer, using the schedule management program, the first subset of information stored in the information management system to a third layer. Transferring the first subset of information may comprise initially transferring the first subset of information to a stage sublayer of the third layer, merging the stage sublayer with a secure sublayer of the third layer, and causing, based on the merging, synchronization of the central information repository with the third layer.

In one or more examples, initially transferring the first subset of information to the stage sublayer may comprise causing, by automatically executing a first script of the plurality of scripts corresponding to the second layer, execution of a shell script corresponding to the first script. Initially transferring the first subset of information to the stage sublayer may further comprise translating, by executing the shell script, the first subset of information into a transferable format and storing the translated first subset of information in the stage sublayer of the third layer of the multi-layered ingestion program.

In one or more arrangements, the computing platform may also store the first subset of information to a view sublayer of the third layer of the multi-layered ingestion program. The view sublayer may be configured to facilitate display of the first subset of information based on an authenticated view request. The computing platform may also cause, based on the authenticated view request and via the view sublayer, display of the first subset of information. In one or more examples, causing display of the first subset of information may comprise executing at least one script, of the plurality of executable scripts, corresponding to the third layer of the multi-layered ingestion program, and caching one or more portions of the first subset of information by executing the at least one script corresponding to the third layer.

In one or more arrangements, the computing platform may receive a request to update the first subset of information based on a second subset of information. The computing platform may transfer the second subset of information from the information management system to the stage sublayer of the third layer of the multi-layered ingestion program, using the schedule management program and by automatically executing a script of the plurality of scripts corresponding to the second layer. In one or more examples, the secure sublayer may include historical information previously ingested by the central information repository within a specific period of time.

In one or more arrangements, the computing platform may automatically generate an ingestion result document. The ingestion result document may include a plurality of categories associated with the first subset of information, a mapping of one or more portions of the first subset of information and corresponding to each of the plurality of categories, and one or more permissible use fields corresponding to the first subset of information. In one or more examples, the computing platform may also cause the computing platform to store the multi-layered ingestion program to the memory of the computing platform.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
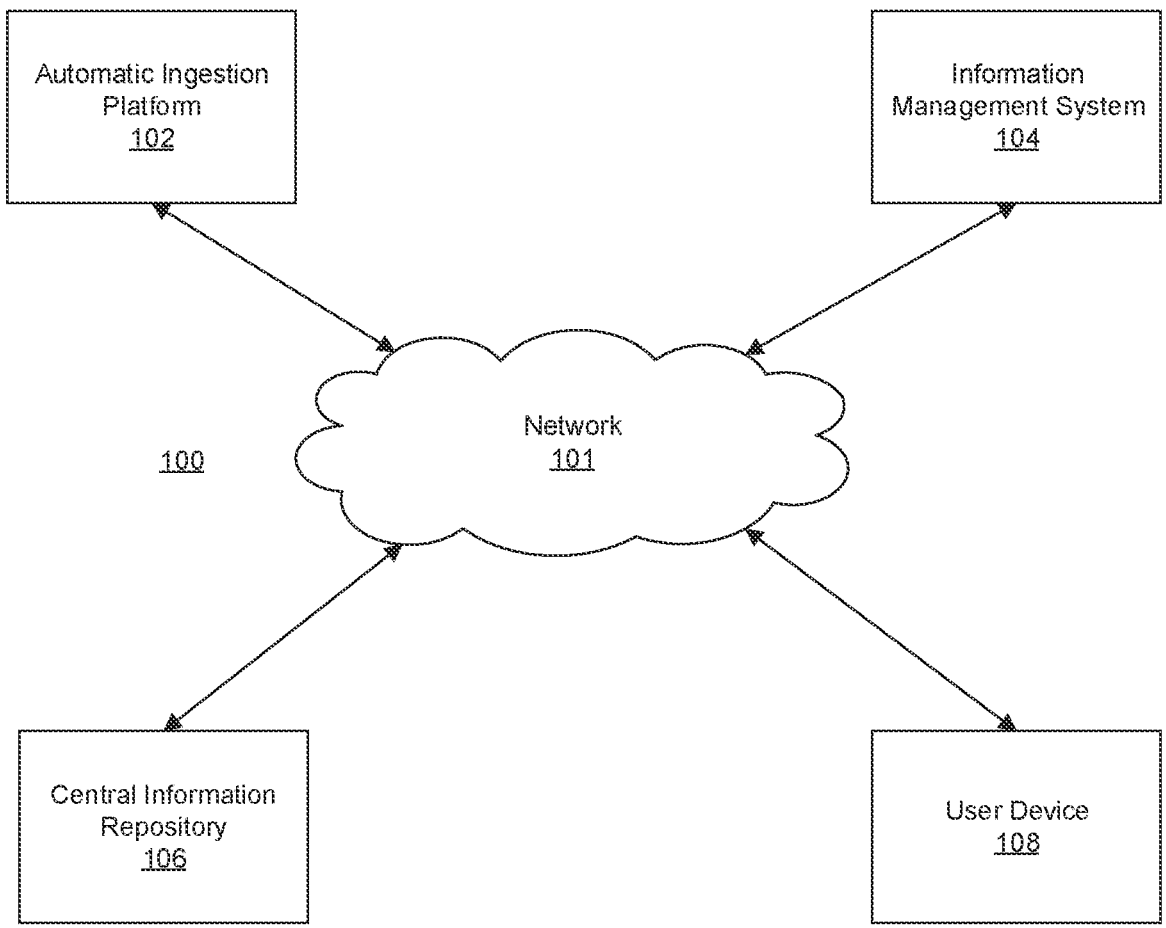
FIGS. 1A-1B depict an illustrative computing environment for automatic script generation using a multi-layered ingestion program in accordance with one or more example arrangements.

In the following description of various illustrative arrangements, reference is made to the accompanying drawings, which form a part hereof, and in which is shown, by way of illustration, various arrangements in which aspects of the disclosure may be practiced. In some instances, other arrangements may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief description of the concepts described further herein, some aspects of the disclosure relate to automatically generating scripts using a multi-layered ingestion program. An enterprise organization (such as a financial institution, and/or other institutions) may need to transfer information (e.g., system of record (SOR) information corresponding to, e.g., account information)) from a storage location (e.g., a regional information database) to a central information repository. In some instances, enterprise organizations may use services integration framework (SIF) programs to ingest the information (e.g., account information corresponding to a client of an enterprise organization, such as a financial institution and/or other organization) from the information management system to the central information repository, such as a strategic data platform (e.g., a data lake, and/or other strategic data platforms). In some examples, ingesting the information may provide easier access to information for users (e.g., employees of the enterprise organization) by collecting multiple subsets of information in a single location.

In some instances, ingestion of the information may include the coordinated use of multiple different software programs and/or scripts configured to perform different tasks at different stages of the ingestion process. For example, at the first stage of the process, a first script (e.g., a data manipulation language (DML) script) may be needed to define the information to be ingested and provide instructions for later programs and/or scripts. The second stage of the process may include transferring the information from the information management system to the central repository, which may use a computer program (e.g., a schedule management program, and/or other computer programs) to manage the transfer process. However, in some instances the transferring of the information may use additional scripts (e.g., shell scripts, and/or other scripts) to facilitate the use of the computer program, and/or scripts to manage a warehousing system (e.g., a system built on top of a data lake) that facilitates the viewing, reading, and/or writing of the information at the data lake. In some instances, an individual (e.g., a software developer at financial institution, and/or other organizations) may manually generate multiple scripts to perform one or more different tasks in the transfer procedure. Manual generation of each script may be a significant expenditure of resources, both in terms of the time required for the user to generate the scripts for each subset of information to be ingested, and the time needed to debug any runtime errors introduced by the user. Accordingly, it may be important to provide an improved method of generating the scripts necessary to transfer the information, where a multi-layered ingestion program may be created that automatically generates functional scripts for each stage of the information transfer process each time an information transfer is requested.

Institutions may employ the multi-layered ingestion program to automatically generate scripts as described above via computing devices (e.g., by receiving commands from a user to generate the multi-layered ingestion program and/or other methods). In some instances, when a query requesting ingestion of information from an information management system (e.g., a regional database management server, and/or other information storage locations) to a central information repository (e.g., a data lake, and/or other central information repositories) is received, the computing device may instruct the ingestion program to automatically generate scripts corresponding to each layer of the ingestion program. In some examples, the scripts corresponding to each layer of the ingestion program may, when executed sequentially, perform all of the functions needed to complete ingestion of the information (e.g., automatically transferring the information), by each software program involved in the ingestion process. For example, the multi-layered ingestion program may include a first layer at which the information to be ingested from an information management system (e.g., a regional database management system, and/or other information management systems) is identified, and a second layer at which a schedule management program transfers the information to be ingested from the information management system to the third layer of the multi-layered ingestion program. The third layer may include synchronizing temporary storage of the information to be transferred with the central repository. In some instances, users (e.g., employees of the enterprise organization) may wish to view the ingested information and/or a subset of the ingested information. Accordingly, the ingestion program may cause display of requested information at the third layer of the ingestion program. Automatically generating the scripts to execute the multi-layered ingestion program may reduce runtime errors by reducing the amount of manual input required by a user attempting to perform information ingestion. This may improve the efficiency of the information ingestion process by reducing the amount of time required to generate the scripts and reducing the resources expended on debugging scripts manually generated by the user at different times.

These and various other aspects will be discussed more fully herein.

Figure 1B:
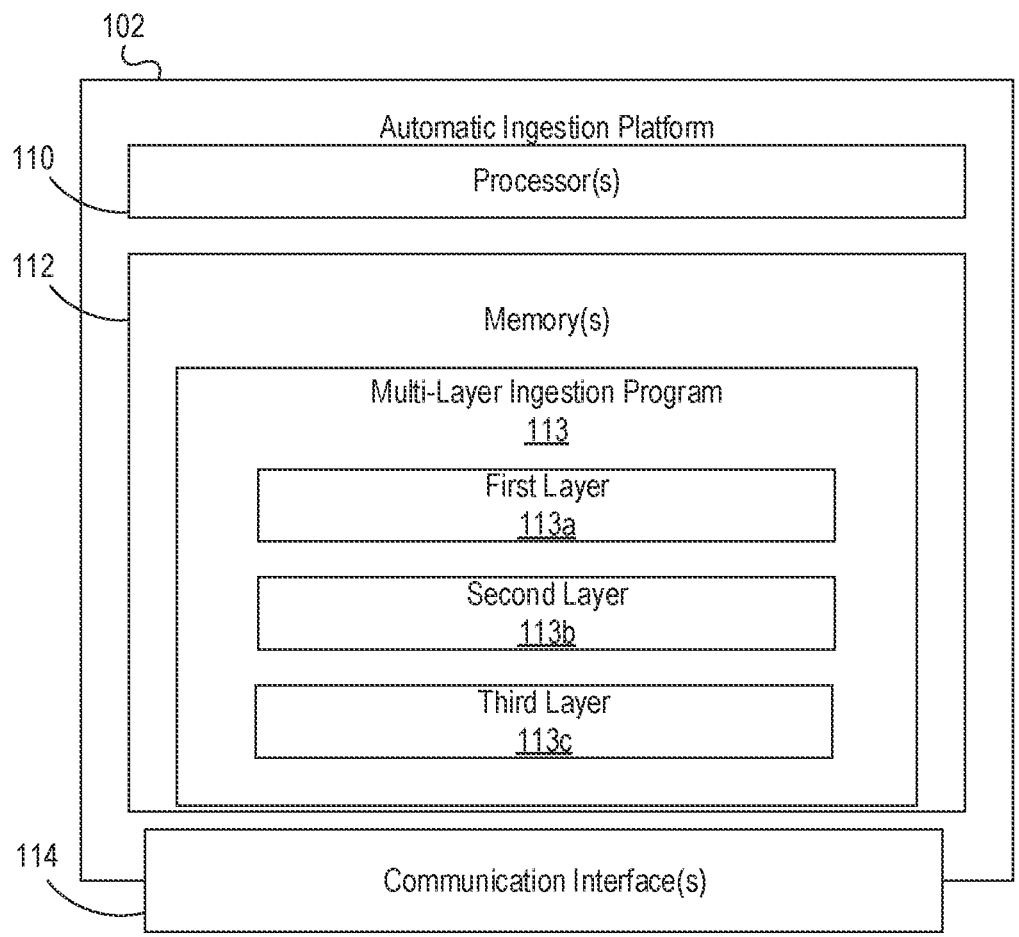

FIGS. 1A-1B depict an illustrative computing environment for automatic script generation using a multi-layered ingestion program in accordance with one or more example arrangements. Referring to FIG. 1A, computing environment 100 may include one or more computer systems. For example, computing environment 100 may include an automatic ingestion platform 102, an information management system 104, a central information repository 106, and a user device 108.

As described further below, automatic ingestion platform 102 may be a computer system that includes one or more computing devices (e.g., laptop computer, desktop computer, mobile device, tablet, smartphone, and/or other devices) and/or other computer components (e.g., processors, memories, communication interfaces) that may be used to implement the multi-layered ingestion program. In some examples, the multi-layered ingestion program may be written, coded, installed, and/or otherwise maintained by the automatic ingestion platform 102. For example, the multi-layered ingestion program may be a program written by an employee of an enterprise organization (e.g., a financial institution, and/or other institutions). In some instances, automatic ingestion platform 102 may be a user device corresponding to a user (e.g., an employee of the enterprise organization, and/or other users). In one or more instances, the automatic ingestion platform 102 may be configured to communicate with one or more systems (e.g., information management system 104, central information repository 106, user device 108, and/or other systems) to perform an information transfer, synchronize stored information, display requested information, and/or perform other functions. In some instances, the automatic ingestion platform 102 may be configured to display one or more graphical user interfaces (e.g., view sublayer interfaces, and/or other interfaces).

The information management system 104 may be and/or otherwise include one or more computing devices (e.g., servers, server blades, and/or other devices) and/or other computer components (e.g., processors, memories, communication interfaces) that may be used to create, host, modify, and/or otherwise validate an organized collection of information (e.g., a regional database). The information management system 104 may be synchronized across multiple nodes (e.g., sites, institutions, geographical locations, and/or other nodes) and may be accessible by multiple users (who may, e.g., be employees of an enterprise organization such as a financial institutions). The information stored at the information management system 104 may include information corresponding to clients of the enterprise organization (e.g., account information, transaction information, asset information, and/or other client information) and/or any additional information. In some instances, the information management system 104 may be accessed by, validated by, and/or modified by any of, automatic ingestion platform 102, user device 108, and/or other devices. Although shown as an independent database, in some instances, the information management system 104 may be part of and/or otherwise integrated into the automatic ingestion platform 102 without departing from the scope of the disclosure.

Although only one information management system is depicted herein, any number of such systems may be used to implement the methods described herein without departing from the scope of the disclosure The central information repository 106 may be and/or otherwise include one or more computing devices (e.g., servers, server blades, and/or other devices) and/or other computer components (e.g., processors, memories, communication interfaces) that may be used to create, host, modify, and/or otherwise validate an organized collection of information in its natural and/or raw format (e.g., a data lake). The collection of information may include information stored in multiple natural and/or raw formats (e.g., structured information, unstructured information, semi-structured information, and/or other formats). The central information repository 106 may be accessible by multiple users (who may, e.g., be employees or clients of an enterprise organization such as a financial institution). The central information repository 106 may include one or more clusters of nodes associated with performing different functions within central information repository 106 (e.g., running parallel computations on information stored in central information repository 106, loading information into the relevant cluster, generate instructions for processing information, and/or other functions). The central information repository 106 may be configured to receive information from user devices (such as automatic ingestion platform 102, and/or other devices) and may be configured to receive information the user device, store the information, retrieve the information based on a request from a user device, and/or perform other functions.

User device 108 may be a computing device (e.g., laptop computer, desktop computer, mobile device, tablet, smartphone, server, server blade, and/or other device) and/or other data storing or computing component (e.g., processors, memories, communication interfaces, databases) that may be used to transfer information between devices and/or perform other user functions (e.g., requesting display of information, displaying information, and/or other functions). In one or more instances, user device 108 may correspond to a first user (who may, e.g., be an employee or client of the enterprise organization, such as a financial institution and/or other institution). In one or more instances, the user device 108 may be configured to communicate with one or more systems (e.g., automatic ingestion platform 102, central information repository 106, and/or other systems) to perform a data transfer, request display of information, and/or to perform other functions. In some instances, the user device 108 may be configured to display one or more graphical user interfaces (e.g., view layer interfaces, and/or other interfaces).

Computing environment 100 also may include one or more networks, which may interconnect automatic ingestion platform 102, information management system 104, central information repository 106, and user device 108. For example, computing environment 100 may include a network 101 (which may interconnect, e.g., automatic ingestion platform 102, information management system 104, central information repository 106, and user device 108).

In one or more arrangements, automatic ingestion platform 102, information management system 104, central information repository 106, and user device 108 may be any type of computing device capable of sending and/or receiving requests and processing the requests accordingly. For example, automatic ingestion platform 102, information management system 104, central information repository 106, user device 108, and/or the other systems included in computing environment 100 may, in some instances, be and/or include server computers, desktop computers, laptop computers, tablet computers, or the like that may include one or more processors, memories, communication interfaces, storage devices, and/or other components. As noted above, and as illustrated in greater detail below, any and/or all of automatic ingestion platform 102, information management system 104, central information repository 106, and user device 108, may, in some instances, be special-purpose computing devices configured to perform specific functions.

Referring to FIG. 1B, automatic ingestion platform 102 may include one or more processors 110, memory 112, and communication interface 114. A data bus may interconnect processor 110, memory 112, and communication interface 114. Communication interface 114 may be a network interface configured to support communication between automatic ingestion platform 102 and one or more networks (e.g., network 101, or the like). Communication interface 114 may be communicatively coupled to the processor 110. Memory 112 may include one or more program modules having instructions that, when executed by processor 110, cause automatic ingestion platform 102 to perform one or more functions described herein and/or one or more databases that may store and/or otherwise maintain information which may be used by such program modules and/or processor 110. In some instances, the one or more program modules and/or databases may be stored by and/or maintained in different memory units of automatic ingestion platform 102 and/or by different computing devices that may form and/or otherwise make up automatic ingestion platform 102. For example, memory 112 may have, host, store, and/or include the multi-layered ingestion program 113.

Multi-layered ingestion program 113 may have instructions that direct and/or cause automatic ingestion platform 102 to automatically generate scripts and implement the automatic ingestion of information. Multi-layered ingestion program 113 may be and/or include one or more layers (e.g., first layer 113a, second layer 113b, and third layer 113c) that each correspond to different stages of automatically ingesting information and each correspond to different scripts. The scripts may be automatically generated by automatic ingestion platform 102 and configured to perform one or more functions associated with the layer. For example, first layer 113a may be configured to execute at least one script to identify a subset of information to be ingested from an information management system (e.g., information management system 104, and/or other information management systems) to a central information repository (e.g., central information repository 106, and/or other central information repositories) (e.g., as described below at step 204). A second layer 113b may be configured to execute multiple scripts to cause the deployment of a schedule management program and the transfer of the subset of information from information management system 104 to central information repository 106 (e.g., as described further below at steps 205-210). A third layer 113c may include a warehousing system (e.g., a fault-tolerant data warehouse system and/or other warehousing systems) built on top of a central information repository's computer architecture (e.g., central information repository 106, and/or other central information repositories) configured to manage (e.g., by executing one or more scripts automatically generated by automatic ingestion platform 102, and/or by other methods) information stored in the central information repository (e.g., by displaying, reading, and/or writing of the information). Each layer of the multi-layered ingestion program 113 may, in some instances, include one or more sub-layers dedicated to performing a particular function associated with the top-level layer.

Figure 2A:
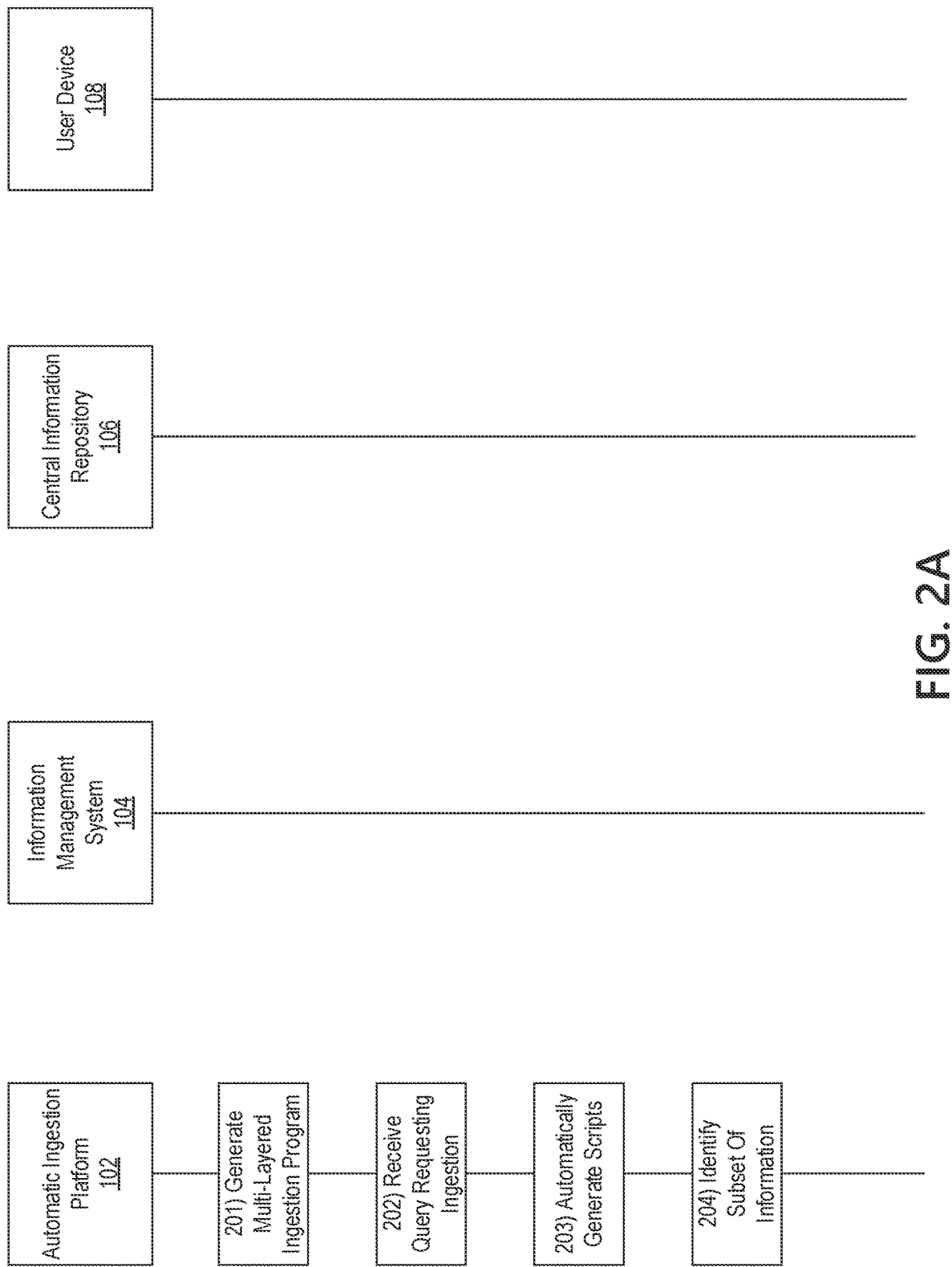
FIGS. 2A-2D depict an illustrative event sequence for automatic script generation using a multi-layered ingestion program in accordance with one or more example arrangements.

FIGS. 2A-2D depict an illustrative event sequence for automatic script generation using a multi-layered ingestion program in accordance with one or more example arrangements. Referring to FIG. 2A, at step 201, the automatic ingestion platform 102 may generate a multi-layered ingestion program (e.g., multi-layered ingestion program 113). In generating the multi-layered ingestion program, in some instances, the automatic ingestion platform 102 may receive user input from a user (e.g., a developer employed by an enterprise organization, such as a financial institution and/or other institutions, and/or other users of automatic ingestion platform 102) causing the automatic ingestion platform 102 to create and store a software application that, when executed, causes automatic ingestion platform 102 to automatically generate scripts corresponding to each layer of the multi-layered ingestion program. For example, the user may provide user input in the form of executable source code which, cumulatively, represent the software application. The source code may be partitioned, based on the user input, such that certain portions of the source code cumulatively cause the performance of a particular function or set of functions (e.g., layers of the multi-layered ingestion program 113, such as first layer 113a, second layer 113b, third layer 113c, and/or other functions or sets of functions) in a particular sequence. The source code may be configured to cause, when executed by the automatic ingestion platform 102, software scripts associated with the performance of each function or set of functions to be generated by the automatic ingestion platform 102.

At step 202, the automatic ingestion platform 102 may receive a query requesting ingestion of information. For example, the automatic ingestion platform 102 may receive a query requesting ingestion of some or all of the information stored in information management system 104. In receiving the query, the automatic ingestion platform 102 may receive user input from a user associated with automatic ingestion platform 102 (e.g., a developer employed by an enterprise organization, such as a financial institution and/or other institutions, and/or other users of automatic ingestion platform 102) requesting ingestion of the information. Additionally or alternatively, in some examples, the automatic ingestion platform 102 may receive an automated notification that new information has been added to the information management system 104 (e.g., by a user associated with the same organization as the user associated with automatic ingestion platform 102). The automated notification may include a query requesting ingestion of the new information in information management system 104. In some instances, the automated notification may be received based on a setting or application included in automatic ingestion platform 102 configured to identify when new information has been added to information management system 104 (e.g., by polling information management system 104 periodically to request the automated notification, by intercepting the automated notification from network traffic of the network 101, and/or by other methods). In some examples, the query may be and/or include a record (e.g., a spreadsheet file, and/or other records) of the information to be ingested from the information management system 104 to the central information repository 106.

At step 203, the automatic ingestion platform 102 may automatically generate the scripts required to perform the functions of a multi-layered ingestion program (e.g., multi-layered ingestion program 113), based on the query. For example, the automatic ingestion platform 102 may mine, extract, and/or otherwise access, from the query, an identification of the information to be ingested and may automatically write, code, and/or otherwise generate the scripts required to execute the multi-layered ingestion program. In some instances, the automatically generated scripts may each correspond to a particular layer of the multi-layered ingestion program. For example, the automatic ingestion platform 102 may automatically generate at least one script corresponding to a first layer (e.g., first layer 113a) of the multi-layered ingestion program which may, for example, be configured to cause the identification of a subset of the information stored in the information management system 104 for ingestion based on the query. Additionally, the automatic ingestion platform 102 may automatically generate one or more scripts corresponding to a second layer (e.g., second layer 113b) of the multi-layered ingestion program which may, e.g., be configured to deploy a schedule management program, transfer a subset of information from the information management system 104 to a stage sublayer of a third layer (e.g., third layer 113c) of the multi-layered ingestion program, merge the stage sublayer with a secure sublayer, and/or perform other functions. Further, in some examples, the automatic ingestion platform 102 may automatically generate at least one script corresponding to a third layer (e.g., third layer 113c) of the multi-layered ingestion program which may, for example, be configured to process information for display to a user device (e.g., user device 108, and/or other user devices).

At step 204, the automatic ingestion platform 102 may identify a subset of the information stored at information management system 104 marked for ingestion to the central information repository 106. For example, the automatic ingestion platform 102 may identify the subset of information requested by a user (e.g., as described above at step 202). In some examples, identifying the subset of information may be a function associated with the first layer of the multi-layered ingestion program. In identifying the subset of information, the automatic ingestion platform 102 may automatically execute at least one script, of the scripts automatically generated at step 203, above, configured to identify the subset of the information. For example, the automatic ingestion platform 102 may execute a data manipulation language (DML) script automatically generated by the automatic ingestion platform 102. The DML script may include a set of instructions (e.g., structured query language (SQL) statements, and/or other sets of instructions) configured to cause the identification of the subset of information stored at information management system 104. For example, in some instances, the DML script may include a set of instructions configured to retrieve information from one or more tables included in and/or identified by the query received at step 202 and then to insert the information into a record (e.g., a spreadsheet file, and/or other records) indicating the information in the information management system 104 marked to be ingested to central information repository 106. The record may, in some instances, include one or more of: 1) a list of the columns of information stored in one or more files in information management system 104 to be ingested to central information repository 106, 2) metadata corresponding to a stage sublayer of the third layer of the multi-layered ingestion program and to a secure sublayer of the third layer, 3) an indicator of one script, of a number of scripts corresponding to the second layer of the multi-layered ingestion process, to execute when transferring information from information management system 104, and/or 4) other information corresponding to the multi-layered ingestion program. Based on executing the at least one script (e.g., the DML script), the automatic ingestion platform 102 may identify the subset of information to be ingested from information management system 104 to central information repository 106.

Figure 2B:
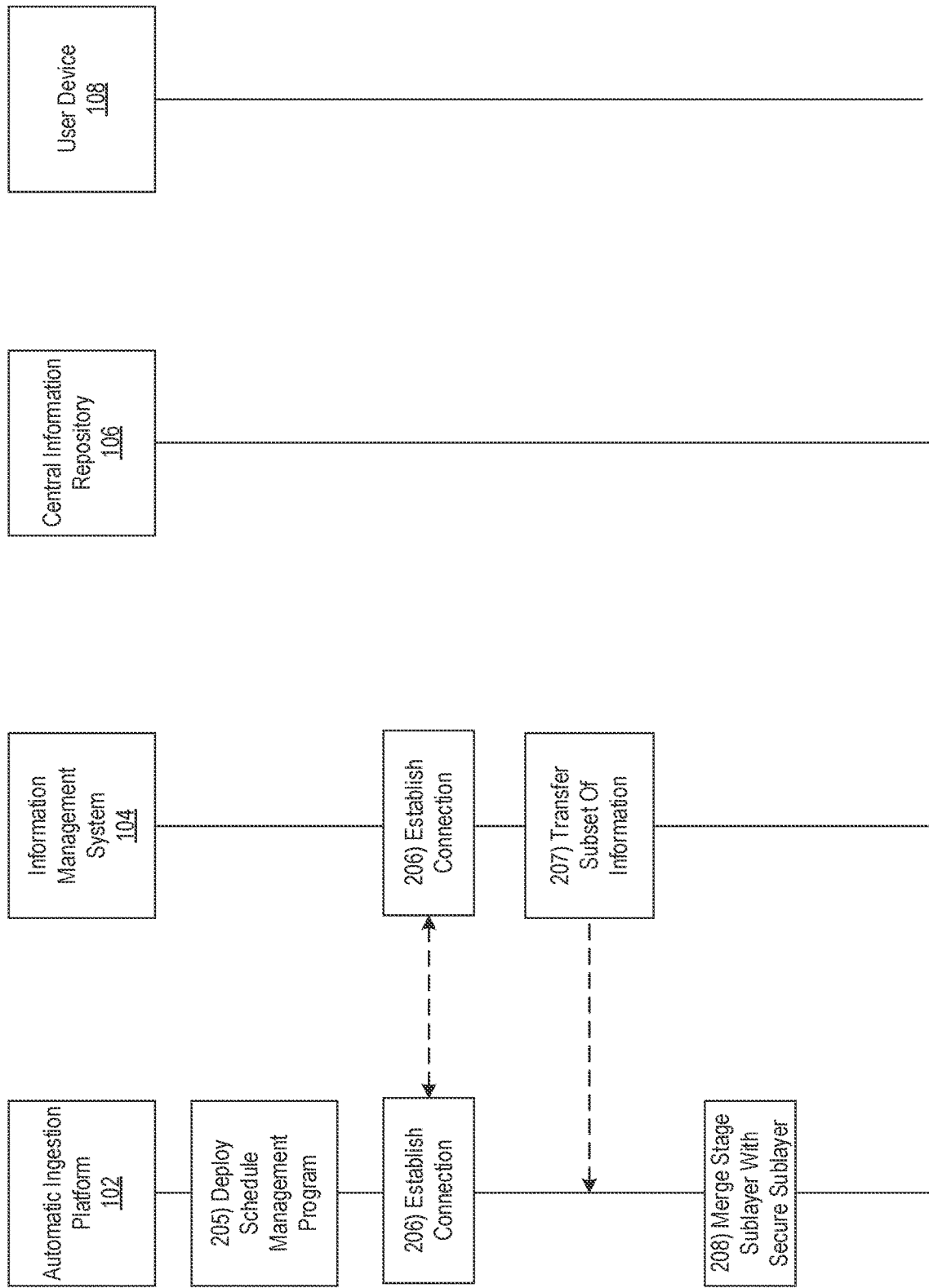

Referring to FIG. 2B, at step 205, the automatic ingestion platform 102 may deploy a schedule management program. For example, the automatic ingestion platform 102 may deploy a schedule management program configured to automate scheduling and performance of jobs (e.g., information transfer, and/or other jobs) on a computing platform (e.g., automatic ingestion platform 102, and/or other computing platforms). In some instances, the schedule management program may be configured to allow users (e.g., the user of automatic ingestion platform 102, and/or other users) to define jobs for the schedule management program to schedule and perform using a script (e.g., a job information language (JIL) script, and/or other scripts) configured to operate in conjunction with the schedule management program.

In deploying the schedule management program, the automatic ingestion platform 102 may execute one of the automatically generated scripts corresponding to the second layer of the multi-layered ingestion program. For example, the automatic ingestion platform 102 may execute a single-use deployment script configured to activate and/or otherwise deploy the schedule management program that may, e.g., be installed on the automatic ingestion platform 102. In some examples, executing the single-use deployment script may cause the schedule management program to automatically generate one or more job scripts (e.g., JIL scripts, and/or other scripts) configured to repeatedly, based on additional queries requesting ingestion of information from information management system 104 to central information repository 106, transfer information from information management system 104 to the third layer of the multi-layered ingestion program (e.g., a full load script, an incremental load script, and/or other scripts). In some examples, these job scripts may be executed by automatic ingestion platform 102 as part of the second layer of the multi-layered ingestion program (e.g., as described below at step 207).

At step 206, the automatic ingestion platform 102 may establish a connection with information management system 104. For example, automatic ingestion platform 102 may establish a first wireless data connection with the information management system 104 to link the information management system 104 with the automatic ingestion platform 102 (e.g., in preparation for transferring information, and/or other functions). In some instances, the automatic ingestion platform 102 may identify whether or not a connection is already established with the information management system 104. If a connection is already established with the information management system 104, the automatic ingestion platform 102 might not re-establish the connection. If a connection is not yet established with the information management system 104, the automatic ingestion platform 102 may establish the first wireless data connection as described above.

At step 207, the automatic ingestion platform 102 may transfer a subset of information from the information management system 104 to the third layer of the multi-layered ingestion program (e.g., via the communication interface 114 and using the first wireless data connection). For example, the automatic ingestion platform 102 may transfer the subset of information identified at step 204 above to a stage sublayer of the third layer of the multi-layered ingestion program. In some instances, the stage sublayer may be a SQL layer (e.g., an architecture layer, and/or other SQL layers) built on top of the computer architecture of the central information repository 106. For example, in some instances, the central information repository 106 may be a data lake incorporating architecture that includes multiple SQL layers to facilitate information storage and processing. In these instances, the automatic ingestion platform 102 may transfer the subset of information from the information management system 104 to the stage sublayer. In some examples, the stage sublayer may be and/or include memory configured to temporarily store one or more subsets of information in their natural format (e.g., structured information, unstructured information, and/or semi-structured information).

In some examples, in transferring the subset of information from information management system 104, the automatic ingestion platform 102 may execute one or more job scripts generated by the schedule management program. For example, the automatic ingestion platform 102 may execute a job script (e.g., a JIL script, and/or other job scripts) configured to transfer, using the schedule management program, the entire subset of information identified by automatic ingestion platform 102 for ingestion from information management system 104 to the stage sublayer of the third layer of the multi-layered ingestion program (e.g., a full load ingestion job script). In some examples, the schedule management program may be unable to read information from records (e.g., the spreadsheet file, and/or other records, identified by executing the DML script and indicating the information in the information management system 104 marked to be ingested to central information repository 106). For example, the schedule management program may be a computer application. In these examples, in transferring the subset of information, the schedule management program may cause automatic ingestion platform 102 to call and/or otherwise execute one or more shell scripts corresponding to the job script, which may, e.g., have been automatically generated by automatic ingestion platform 102 at step 203 above. The one or more shell scripts may be configured to read the subset of information from the record identified by executing the DML script (e.g., as described above at step 204) and translate the subset of information into a transferable format. For example, in some instances, a shell script may access the record identifying the subset of information, parse the underlying code and/or metadata corresponding to the subset of information, and reformat the subset of information into a format the shell script is configured to write to a storage location (e.g., the stage sublayer, and/or other storage locations). In some examples, the shell script may be further configured to store the subset of information to the stage sublayer (e.g., by storing the subset of information to memory of the stage sublayer). Additionally or alternatively, in some instances, based on identifying that some or all of the subset of information is already in a transferable format, the shell script may store the subset of information to the stage sublayer without translating the subset of information.

Additionally or alternatively, in some instances, in transferring the subset of information the automatic ingestion platform 102 may execute a job script (e.g., a JIL script, and/or other job scripts) configured to transfer, using the schedule management program, only a portion of the subset of information identified by automatic ingestion platform 102 for ingestion from information management system 104 to the stage sublayer of the multi-layered ingestion program. For example, in some instances, some of the subset of information may have previously been ingested from information management system 104 to central information repository 106 in previous instances of executing the multi-layered ingestion program. In these examples, only the portion of the subset of information (i.e., a second subset of information, relative to the previously-ingested first subset of information) including new and/or updated information may be transferred by the automatic ingestion platform 102 (e.g., by executing an incremental load ingestion job script, and/or other job scripts). For instance, the schedule management program may cause automatic ingestion platform 102 to call and/or otherwise execute one or more shell scripts based on executing the job script. The shell scripts may, e.g., have been automatically generated by automatic ingestion platform 102 at step 204. In these instances, the one or more shell scripts may be configured to identify, based on a record of previously ingested information, the portion of the subset of information including new and/or updated information.

Accordingly, the shell scripts may cause the transfer of the portion of the subset of information from the information management system 104 to the stage sublayer. For example, the shell scripts may be configured to read the portion of the subset of information from the record identified by executing the DML script (e.g., as described above at step 204) and translating the portion of the subset of information into a transferable format. For example, in some instances, a shell script may access the record identifying the subset of information, parse the underlying code and/or metadata corresponding to the portion of the subset of information, and reformat the portion of the subset of information into a format the shell script is configured to write to a storage location (e.g., the stage sublayer, and/or other storage locations). In some examples, the shell script may be further configured to store the portion of the subset of information to the stage sublayer (e.g., by storing the subset of information to memory of the central information repository 106 corresponding to the stage sublayer, and/or other memory). Additionally or alternatively, in some instances, based on identifying that some or all of the subset of information is already in a transferable format, the shell script may store the subset of information to the stage sublayer without translating the subset of information.

At step 208, the automatic ingestion platform 102 may merge the stage sublayer with a secure sublayer. For example, the automatic ingestion platform 102 may merge the stage sublayer with a secure sublayer of the third layer of the multi-layered ingestion program. In some instances, returning to the example where the central information repository 106 may be a data lake incorporating architecture that includes multiple SQL layers, the secure sublayer may be a SQL layer built on top of the computer architecture of central information repository 106. In some examples, the secure sublayer may contain historical information previously ingested from an information management system (e.g., the information management system 104, and/or other information management systems) which may, for example, have been ingested during previous instances of automatic ingestion platform 102 executing scripts generated by the multi-layered ingestion program, and/or by other means. For example, in some instances, the secure sublayer may contain all of the information stored in information management system 104 at a previous point in time, while the stage sublayer may include current updates to some or all of said information. Additionally or alternatively, in some instances, the secure sublayer may include information previously ingested from an information management system (e.g., the information management system 104, and/or other information management systems) within a specific period of time (e.g., hours, days, weeks, months, years, and/or other periods of time). For instance, the central information repository 106 may have been previously configured to temporarily store information at the secure sublayer for a predetermined period of time (e.g., hours, days, weeks, months, years, and/or other periods of time) and may have been further configured to remove the stored information from the secure sublayer after the passage of the predetermined period of time. In these instances, merging the stage sublayer with the secure sublayer may result in some or all of the historical information being updated by the subset of information or the portion of the subset of information stored at the stage sublayer.

In merging the stage sublayer with the secure sublayer, the automatic ingestion platform 102 may execute one or more scripts of the automatically generated scripts corresponding to the second layer of the multi-layered ingestion program. Execution of the one or more scripts by the automatic ingestion platform 102 may cause the subset of information stored at the stage sublayer to be added to the secure sublayer. For example, in some instances, the information at the secure sublayer may be represented by a table of rows and columns of information, and merging the stage sublayer with the secure sublayer may include adding the subpart of information stored at the stage sublayer to the table at the secure sublayer, in the form of additional rows and/or columns of information. Additionally or alternatively, in some examples, merging the stage sublayer with the secure sublayer may include overwriting a portion of the information in the table at the secure sublayer with corresponding information (e.g., updated account information, and/or other information) of the subpart of information stored at the stage sublayer. In some instances, some or all of the subpart of information stored at the stage sublayer may be duplicative of information represented by the table at the secure sublayer. In these instances, executing the one or more scripts may cause the automatic ingestion platform 102 to identify duplicate information. For example, the automatic ingestion platform 102 may execute a deduplication script, automatically generated by the multi-layered ingestion program, comparing each entry of the table at the secure sublayer with each entry of a similar table, of the subset of information to be ingested, at the stage sublayer, in order to identify if any entries include information present in both tables. Based on identifying duplicate information (e.g., one or more entries including the same information), the automatic ingestion platform 102 may cause (e.g., by further executing the deduplication script, and/or executing additional scripts) the removal of the duplicate information from the subset of information stored at the stage sublayer.

Figure 2C:
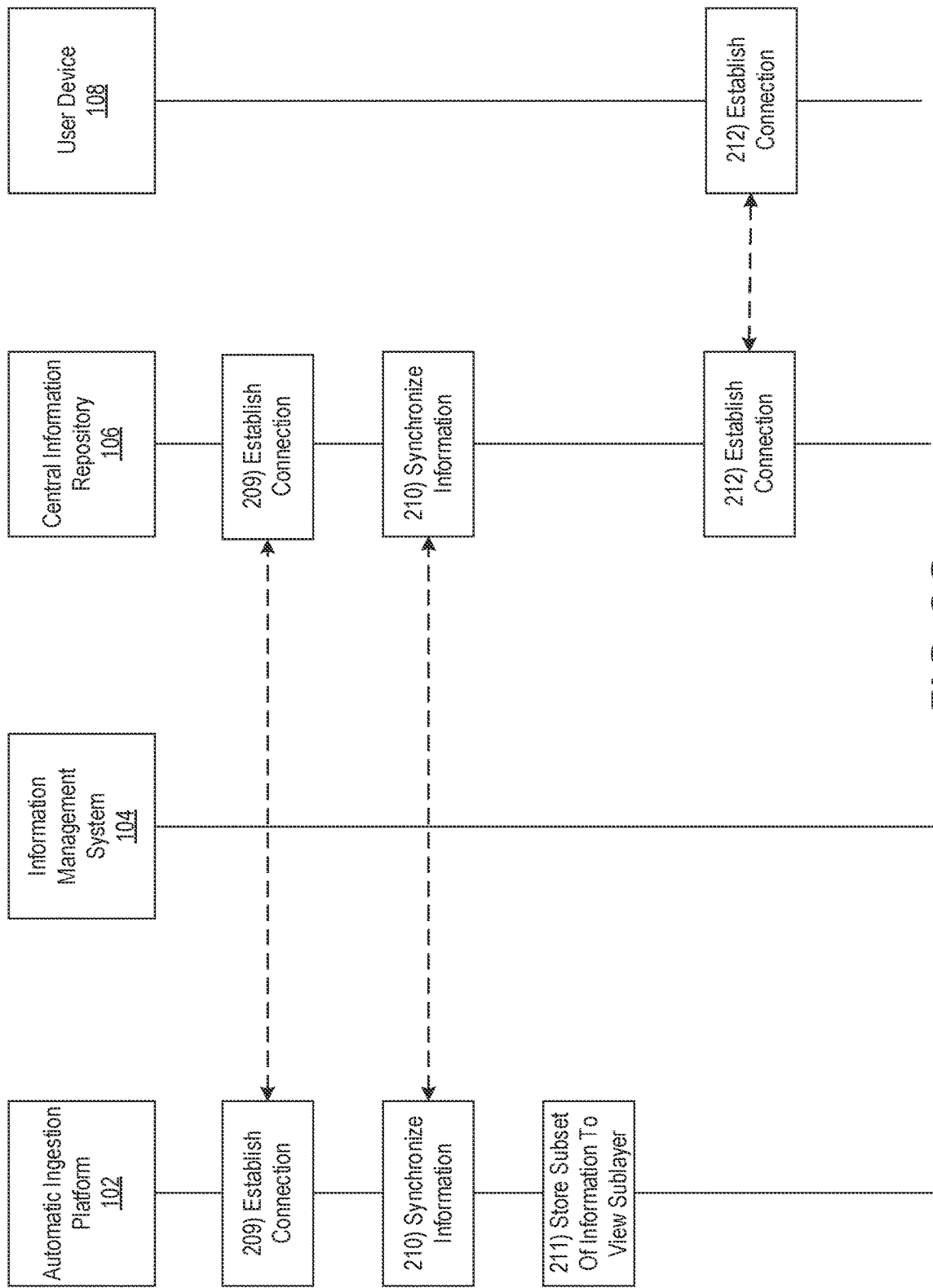

Referring to FIG. 2C, at step 209, the automatic ingestion platform 102 may establish a connection with central information repository 106. For example, automatic ingestion platform 102 may establish a second wireless data connection with the central information repository 106 to link the central information repository 106 with the automatic ingestion platform 102 (e.g., in preparation for synchronizing information, and/or other functions). In some instances, the automatic ingestion platform 102 may identify whether or not a connection is already established with the central information repository 106. For example, a connection may have already existed between automatic ingestion platform 102 and central information repository 106 for transferring the subset of information to the stage sublayer and for merging the stage sublayer with the secure sublayer (e.g., as described above at steps 207-208). If a connection is already established with the central information repository 106, the automatic ingestion platform 102 might not re-establish the connection. If a connection is not yet established with the central information repository 106, the automatic ingestion platform 102 may establish the second wireless data connection as described above.

At step 210, the automatic ingestion platform 102 may cause the central information repository 106 to synchronize information with the secure sublayer. For example, the automatic ingestion platform 102 may cause (e.g., by sending one or more commands via the communication interface 114 and using the second wireless data connection) the central information repository 106 to synchronize the subset of information, stored at the secure sublayer (e.g., after merging the stage sublayer with the secure sublayer, as described above at step 208), with an architecture included in central information repository 106 (e.g., a flat information management architecture, such as a data lake, and/or other architectures). In some instances, in causing the central information repository 106 to synchronize information the automatic ingestion platform 102 may execute a script, of the automatically generated scripts corresponding to the third layer of the multi-layered ingestion process, configured to store the information at the secure sublayer to the architecture included in central information repository 106. For example, executing the script may cause the central information repository 106 to read the subpart of information stored at the secure sublayer and write the subpart of information to a data lake included in central information repository 106. In these examples, the same subpart of information may be stored at the secure sublayer and at the data lake. In some instances, the central information repository 106 may be configured to delete the subpart of information stored at the secure sublayer after a predetermined period of time.

At step 211, the automatic ingestion platform 102 may store the subset of information to a view sublayer of the third layer of the multi-layered ingestion program. For example, the automatic ingestion platform 102 may execute a script, automatically generated by the automatic ingestion platform 102 and corresponding to the third layer of the multi-layered ingestion program, which may, e.g., store a copy of the subset of information to the memory of the central information repository 106 (e.g., by storing the subset of information to memory of the central information repository 106 corresponding to the view sublayer, and/or other memory). In some instances, the view sublayer may be and/or include a table configured to allow access to a specific subgroup of users who may request display of information stored to central information repository 106 (e.g., a group of employees of an enterprise organization, such as financial institution and/or other institutions, who are not authorized to view the secure sublayer, and/or other subgroups of users).

At step 212, the user device 108 may establish a connection with central information repository 106. For example, user device 108 may establish a third wireless data connection with the central information repository 106 to link the central information repository 106 with the user device 108 (e.g., in preparation for sending queries to view information ingested to central information repository 106, to display information requested by user device 108, and/or other functions). In some instances, the user device 108 may identify whether or not a connection is already established with the central information repository 106. If a connection is already established with the central information repository 106, the user device 108 might not re-establish the connection. If a connection is not yet established with the central information repository 106, the user device 108 may establish the third wireless data connection as described above.

Figure 2D:
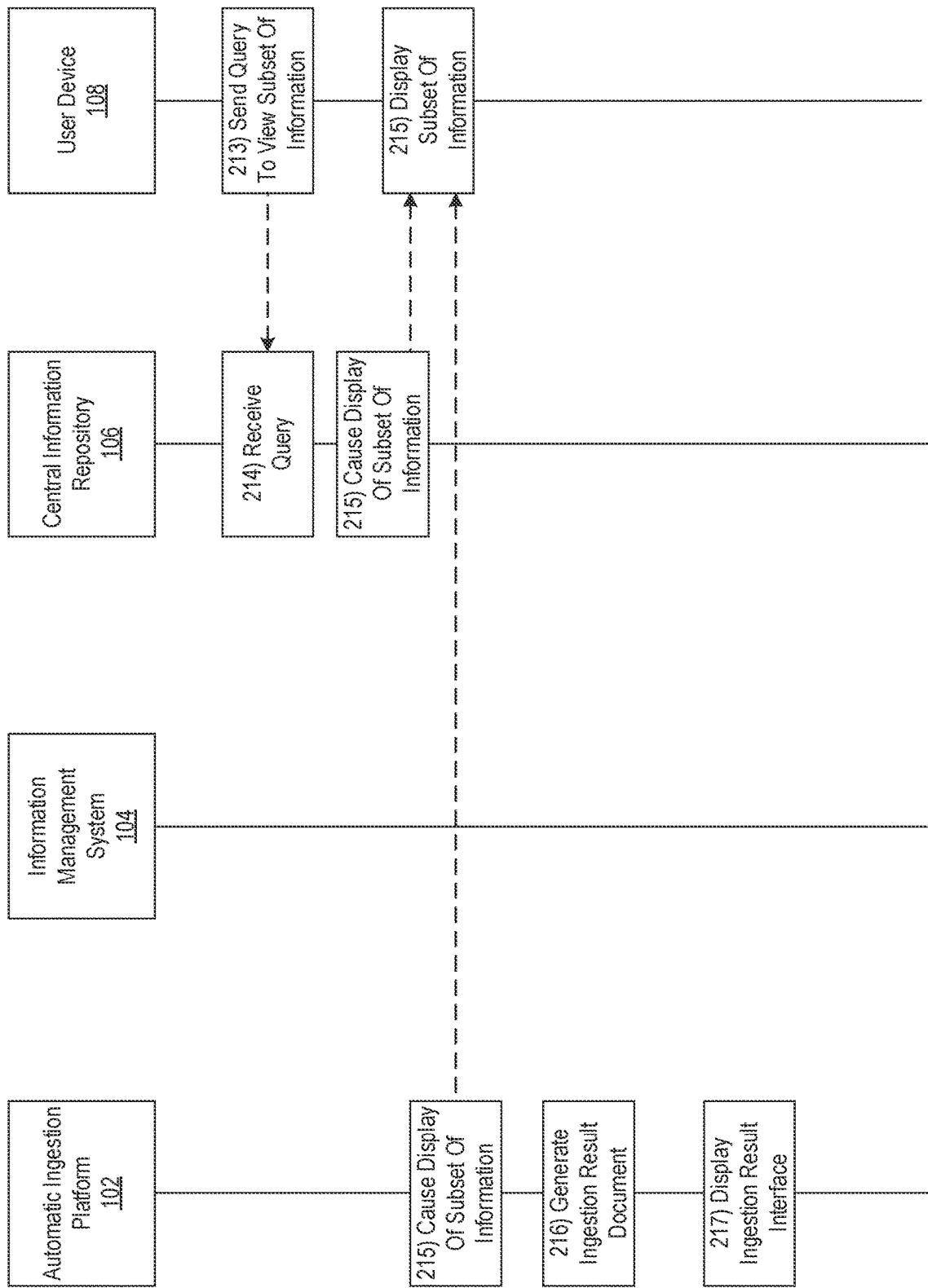

Referring to FIG. 2D, at step 213, the user device 108 may send a query (e.g., an electronic view request, and/or other queries) to the central information repository 106. For example, the user device 108 may send the query via a communication interface and while the third wireless data connection is established. In some examples, the query may request a user be allowed to view, via display at user device 108, information stored to central information repository 106. For instances, the query may request viewing of the subset of information stored to the secure sublayer and/or to the view sublayer. In some examples, the query may be authenticated (e.g., by an authentication device corresponding to central information repository 106 and/or to user device 108). For example, the query may be authenticated by analyzing, at central information repository 106 and/or at user device 108, metadata corresponding to the user associated with user device 108 and identifying that the user is authorized to view the requested information.

Figure 3A:
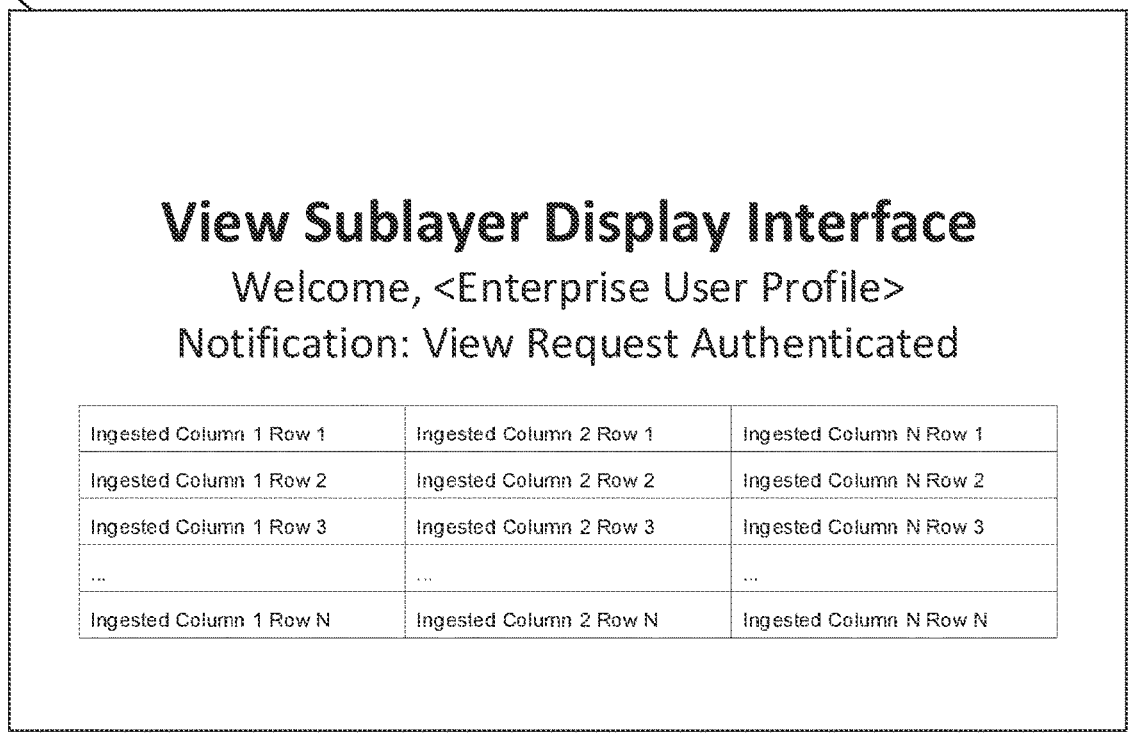
FIGS. 3A-3B depict illustrative graphical user interfaces depicting automatic script generation using a multi-layered ingestion program in accordance with one or more example arrangements.

At step 214, the central information repository 106 may receive the query from user device 108. For example, the central information repository 106 may receive the query via a communication interface and while the third wireless data connection is established. In some examples, based on receiving the query, the central information repository 106 may cause the user device 108 to display the requested information. For example, the central information repository 106 may cause the user device 108 to display a view sublayer display interface (e.g., as shown in FIG. 3A and described below at step 215). In some instances, the central information repository 106 may cause the user device 108 to display the requested information based on actions (e.g., as described at step 215, below) previously performed by the automatic ingestion platform 102. The actions previously performed by the automatic ingestion platform 102 may facilitate display of the requested information by user device 108. In some examples, the query from user device 108 may include one or more authentication factors (e.g., a password, a username, a passcode, a login token, and/or other authentication factors). In these examples, the central information repository 106 may authenticate the query by comparing the one or more authentication factors to a list of permissions determining access to the subset of information and/or to the view sublayer. For instance, the central information repository 106 may compare a login token associated with a user of user device 108 and included in the query (e.g., an electronic view request, and/or other queries) with a list of login tokens granting access to the view sublayer to determine that the user device 108 is allowed to access the view sublayer and may, based on the comparison, grant access to the view sublayer (e.g., by authenticating the view request, and/or other methods of granting access).

At step 215, based on the query from user device 108, the central information repository 106 may cause display of the requested information by user device 108. For example, the central information repository 106 may include metadata (e.g., table definitions, and/or other metadata) corresponding to one or more portions of a subset of information (e.g., a subset of the information stored to the secure sublayer, and/or other information). The central information repository 106 may parse the metadata and the query to determine a storage location corresponding to the requested information. Based on determining the storage location, the central information repository 106 may send one or more commands to the user device 108 causing the user device 108 to display a user interface representing the requested information. For example, the user device 108 may display a graphical user interface similar to view sublayer display interface 300, as illustrated in FIG. 3A.

Referring to FIG. 3A, in some instances, the view sublayer display interface 300 may include information corresponding to the information stored in the central information repository 106 and requested by user device 108. For example, the view sublayer display interface 300 may include information such as a notification that the view request was authenticated, a table and/or tables representing the one or more portions of the subset of information stored to the secure sublayer, and/or other information.

Additionally or alternatively, in some examples, the automatic ingestion platform 102 may have, prior to the central information repository 106 receiving the query from the user device 108, previously performed actions configured to assist the the central information repository 106 in causing display, based on receiving a query to view information (e.g., the subset of information stored to the view sublayer, and/or other information), of the requested information. For example, in facilitating the causing display of the requested information (e.g., the subset of information, and/or other information), the automatic ingestion platform 102 may, prior to the central information repository 106 receiving the query from the user device 108, execute at least one script automatically generated by the automatic ingestion platform 102 and corresponding to the third layer of the multi-layered ingestion program. For instance, the automatic ingestion platform 102 may execute a parallel processing script corresponding to a parallel processing engine configured to operate in memory of the central information repository 106. The parallel processing script may cause the central information repository 106 to cache the metadata (e.g., table definitions, and/or other metadata) corresponding to one or more portions of a subset of information (e.g., a subset of the information stored to the secure sublayer, and/or other information) to reduce the runtime required to display information (e.g., the information requested for viewing by the user device 108, and/or other information). For example, the parallel processing script may, after being executed by the automatic ingestion platform 102, cache table definitions (e.g., by storing the definitions to memory of central information repository 106, and/or other memory) identifying one or more portions of a subset of information (e.g., the subset of information identified by automatic ingestion platform 102 at step 204, as described above). In these examples, when the one or more portions of the subset of information are requested for viewing by a user device (e.g., user device 108, and/or other user devices), the cached table definitions may be used by the central information repository 106 to identify the requested information at a corresponding storage location (e.g., the view sublayer, and/or other storage locations). Accordingly, the central information repository 106 may cause display of the subset of information, and the causing may be facilitated by the automatic ingestion platform 102.

At step 216, the automatic ingestion platform 102 may generate an ingestion result document. For example, the automatic ingestion platform 102 may generate a text document that includes metadata corresponding to the subset of information ingested from information management system 104 to central information repository 106 (e.g., the subset of information identified by automatic ingestion platform 102 at step 204, as described above, and/or other subsets of information). In some examples, the ingestion result document may include information corresponding to a plurality of categories associated with the subset of information. For example, the ingestion result document may include information that identifies which columns in a table correspond to a given category (e.g., account information, transaction information, account information corresponding to a particular user, indicators of permissible use fields, and/or other categories of information). For instance, the ingestion result document may include a mapping (e.g., via one or more identifiers) of portions of the subset of information to their corresponding categories. Additionally or alternatively, the ingestion result document may include one or more indicators of permissible use fields corresponding to the subset of information. The permissible use fields may correspond to information with additional storage instructions and/or rules determining access to the subset of information (e.g., personal identifying information, demographic information, and/or other information requiring permission to access).

Figure 3B:
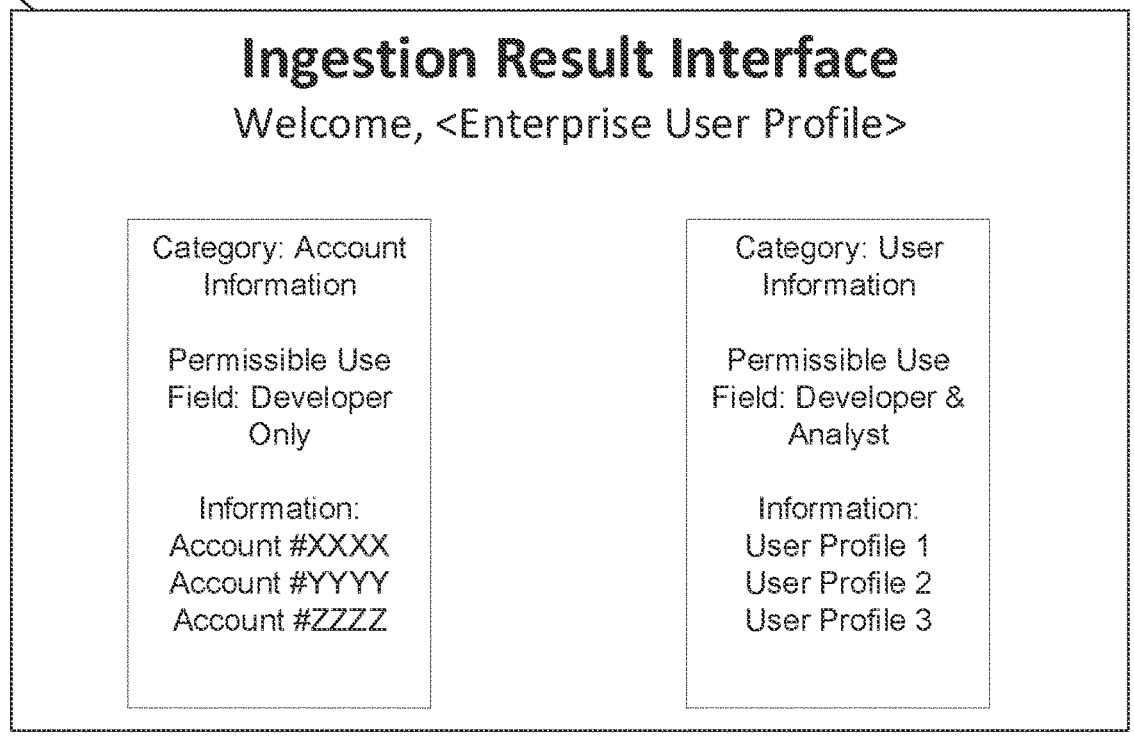

At step 217, based on generating the ingestion result document, the automatic ingestion platform 102 may display some or all of the ingestion result document. For example, the automatic ingestion platform 102 may execute one or more commands causing a user device (which may, e.g., be and/or be associated with automatic ingestion platform 102) to display an ingestion result interface. For instance, the automatic ingestion platform 102 may display a graphical user interface similar to ingestion result interface 310, which is illustrated in FIG. 3B. Referring to FIG. 3B, in some instances, the ingestion result interface 310 may include information corresponding to the ingestion result document. For example, the ingestion result interface 310 may include information such as a plurality of categories associated with the subset of information, permissible use fields, a mapping of portions of the subset of information to their corresponding categories, and/or other information.

Figure 4:
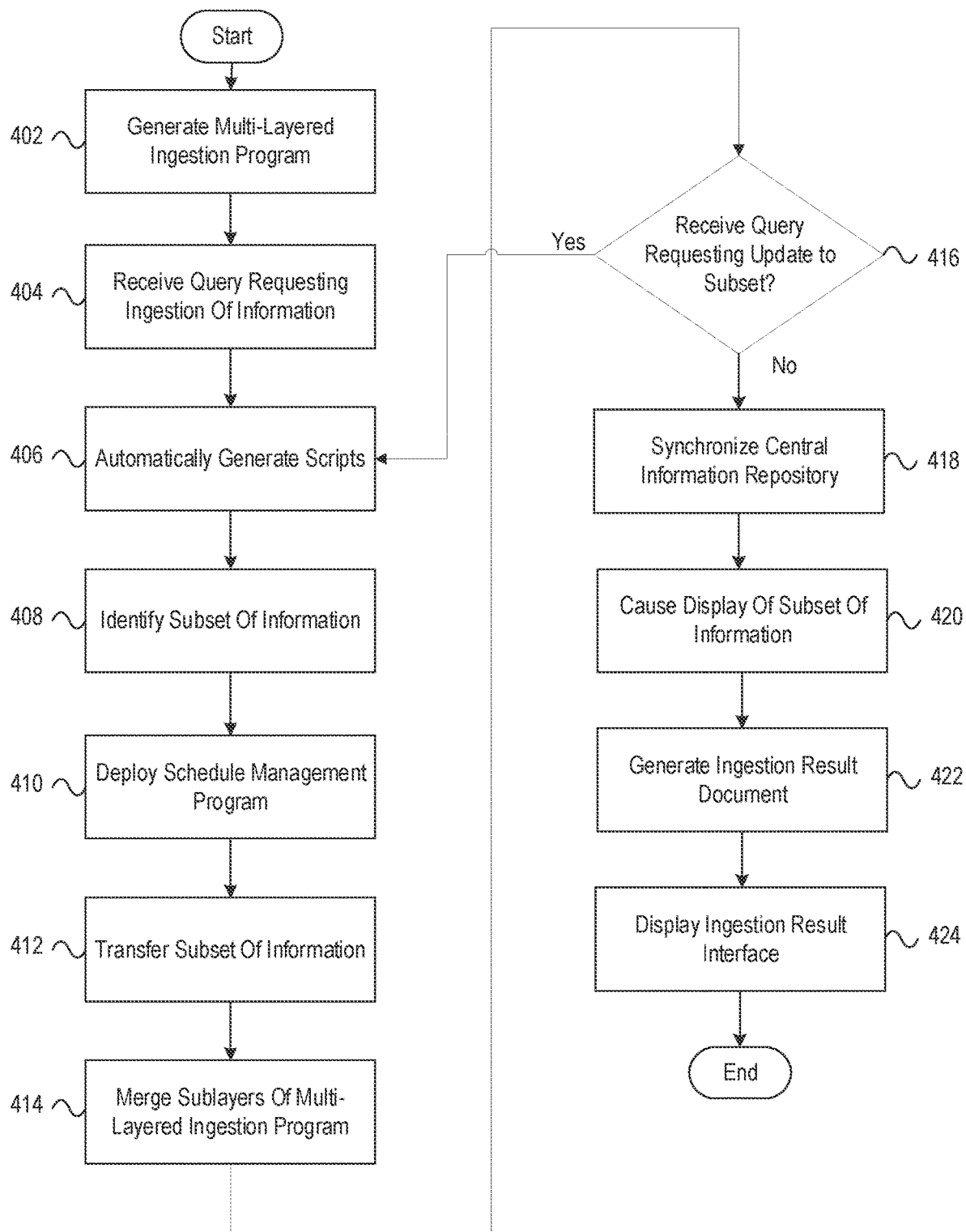
FIG. 4 depicts an illustrative method for automatic script generation using a multi-layered ingestion program in accordance with one or more example arrangements.

FIG. 4 depicts an illustrative method for automatic script generation using a multi-layered ingestion program in accordance with one or more aspects described herein. Referring to FIG. 4, at step 402, a computing device having at least one processor, a communication interface, and memory may generate a multi-layered ingestion program. At step 404, the computing device may receive a query requesting ingestion of information. At step 406, based on the multi-layered ingestion program, the computing device may automatically generate scripts. At step 408, the computing device may identify a subset of information in an information management system. At step 410, the computing device may deploy a schedule management program.

At step 412, the computing device may transfer the subset of information from the information management system to a layer of the multi-layered ingestion program. At step 414, the computing device may merge sublayers of the multi-layered ingestion program. At step 416, the computing device may determine whether an additional query has been received, requesting an update to the subset of information. Based on identifying that the computing device did receive an additional query, the computing device may return to step 406 and automatically generate updated scripts. Based on identifying that the computing device did not receive an additional query, the computing device may progress to step 418. At step 418, the computing device may synchronize a central information repository. At step 420, the computing device may cause display of a subset of information. At step 422, the computing device may generate an ingestion result document. At step 424, the computing device may display an ingestion result interface.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various arrangements. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative arrangements, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative arrangements thereof. Numerous other arrangements, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:
1. A computing platform comprising:
at least one processor;
a communication interface communicatively coupled to the at least one processor; and
memory storing computer-readable instructions that, when executed by the at least one processor, cause the computing platform to:
generate a multi-layered ingestion program configured to automatically ingest information from an information management system to a central information repository;

receive a query requesting ingestion of information, from the information management system and to the central information repository, wherein the central information repository is remote from the computing platform;
automatically generate, using the multi-layered ingestion program and based on the query, a plurality of executable scripts, wherein each executable script of the plurality of executable scripts corresponds to a layer of the multi-layered ingestion program, wherein the plurality of executable scripts comprises:
at least one script corresponding to a first layer of the multi-layered ingestion program, and
a plurality of scripts corresponding to a second layer of the multi-layered ingestion program,
identify, by automatically executing the at least one script corresponding to the first layer, a first subset of information stored in the information management system, wherein the first subset of information stored in the information management system comprises information marked for ingestion to the central information repository; and
execute the plurality of scripts corresponding to the second layer to ingest the first subset of information, wherein executing the plurality of scripts corresponding to the second layer causes the computing platform to:
deploy a schedule management program for the second layer; and
transfer, using the schedule management program, the first subset of ingested information stored in the information management system to a third layer, wherein transferring the first subset of ingested information to the third layer comprises:
initially transferring the first subset of ingested information to a stage sublayer of the third layer, wherein the stage sublayer comprises memory that stores the first subset of ingested information in a first format;
merging the stage sublayer with a secure sublayer of the third layer, wherein the secure sublayer comprises a structured query language layer of the central information repository that stores the first subset of ingested information in the first format and in a second format; and
causing, based on the merging, synchronization of the central information repository with the third layer.

2. The computing platform of claim 1, wherein initially transferring the first subset of ingested information to the stage sublayer comprises:
causing, by automatically executing a first script of the plurality of scripts corresponding to the second layer, execution of a shell script corresponding to the first script;
translating, by executing the shell script, the first subset of ingested information into a transferable format; and
storing the translated first subset of ingested information in the stage sublayer of the third layer of the multi-layered ingestion program.

3. The computing platform of claim 1, wherein the memory stores additional computer-readable instructions that, when executed by the at least one processor, cause the computing platform to:
store, prior to transferring the first subset of ingested information to the third layer, the first subset of ingested information to a view sublayer of the third layer of the multi-layered ingestion program, wherein the view sublayer is configured to, based on an authenticated view request, facilitate display of the first subset of ingested information; and
cause, based on the authenticated view request and via the view sublayer, display of the first subset of ingested information.

4. The computing platform of claim 3, wherein the causing display of the first subset of ingested information comprises:
executing, based on the storing, at least one script, of the plurality of executable scripts, corresponding to the third layer of the multi-layered ingestion program; and
caching, by executing the at least one script corresponding to the third layer, one or more portions of the first subset of ingested information.

5. The computing platform of claim 1, wherein the memory stores additional computer-readable instructions that, when executed by the at least one processor, cause the computing platform to:
receive a request to update the first subset of ingested information based on a second subset of information;
transfer, using the schedule management program and by automatically executing a script of the plurality of scripts corresponding to the second layer, the second subset of information from the information management system to the stage sublayer of the third layer of the multi-layered ingestion program; and
update, based on the second subset of information, the first subset of ingested information at the secure sublayer by merging the first subset of ingested information with the second subset of information.

6. The computing platform of claim 1, wherein the secure sublayer includes historical information previously ingested by the central information repository within a specific period of time.

7. The computing platform of claim 1, wherein the memory stores additional computer-readable instructions that, when executed by the at least one processor, cause the computing platform to:
automatically generate an ingestion result document, wherein the ingestion result document includes:
a plurality of categories associated with the first subset of ingested information;
a mapping of one or more portions of the first subset of ingested information and corresponding to each of the plurality of categories; and
one or more permissible use fields indicating a portion of the first subset of ingested information that requires authentication to receive access to the portion.

8. The computing platform of claim 1, wherein the memory stores additional computer-readable instructions that, when executed by the at least one processor, cause the computing platform to store the multi-layered ingestion program to the memory of the computing platform.

9. A method comprising:
at a computing platform comprising at least one processor, a communication interface, and memory:
generating a multi-layered ingestion program configured to automatically ingest information from an information management system to a central information repository;
receiving a query requesting ingestion of information, from the information management system and to the central information repository, wherein the central information repository is remote from the computing platform;

automatically generating, using the multi-layered ingestion program and based on the query, a plurality of executable scripts, wherein each executable script of the plurality of executable scripts corresponds to a layer of the multi-layered ingestion program, wherein the plurality of executable scripts comprises:
  at least one script corresponding to a first layer of the multi-layered ingestion program, and
  a plurality of scripts corresponding to a second layer of the multi-layered ingestion program, identifying, by automatically executing the at least one script corresponding to the first layer, a first subset of information stored in the information management system, wherein the first subset of information stored in the information management system comprises information marked for ingestion to the central information repository; and executing the plurality of scripts corresponding to the second layer to ingest the first subset of information, wherein executing the plurality of scripts corresponding to the second layer causes the computing platform to:
  deploy a schedule management program for the second layer; and
  transfer, using the schedule management program, the first subset of ingested information stored in the information management system to a third layer, wherein transferring the first subset of ingested information to the third layer comprises:
    initially transferring the first subset of ingested information to a stage sublayer of the third layer, wherein the stage sublayer comprises memory that stores the first subset of ingested information in a first format;
    merging the stage sublayer with a secure sublayer of the third layer, wherein the secure sublayer comprises a structured query language layer of the central information repository that stores the first subset of ingested information in the first format and in a second format; and
    causing, based on the merging, synchronization of the central information repository with the third layer.

10. The method of claim 9, wherein initially transferring the first subset of ingested information to the stage sublayer comprises:
  causing, by automatically executing a first script of the plurality of scripts corresponding to the second layer, execution of a shell script corresponding to the first script;
  translating, by executing the shell script, the first subset of ingested information into a transferable format; and
  storing the translated first subset of ingested information in the stage sublayer of the third layer of the multi-layered ingestion program.

11. The method of claim 9, further comprising:
  storing, prior to transferring the first subset of ingested information to the third layer, the first subset of ingested information to a view sublayer of the third layer of the multi-layered ingestion program, wherein the view sublayer is configured to, based on an authenticated view request, facilitate display of the first subset of ingested information; and
  causing, based on the authenticated view request and via the view sublayer, display of the first subset of ingested information.

12. The method of claim 11, wherein the causing display of the first subset of ingested information comprises:
  executing, based on the storing, at least one script, of the plurality of executable scripts, corresponding to the third layer of the multi-layered ingestion program; and
  caching, by executing the at least one script corresponding to the third layer, one or more portions of the first subset of ingested information.

13. The method of claim 9, further comprising:
  receiving a request to update the first subset of ingested information based on a second subset of information;
  transferring, using the schedule management program and by automatically executing a script of the plurality of scripts corresponding to the second layer, the second subset of information from the information management system to the stage sublayer of the third layer of the multi-layered ingestion program; and
  updating, based on the second subset of information, the first subset of ingested information at the secure sublayer by merging the first subset of ingested information with the second subset of information.

14. The method of claim 9, further comprising:
  automatically generating an ingestion result document, wherein the ingestion result document includes:
    a plurality of categories associated with the first subset of ingested information;
    a mapping of one or more portions of the first subset of ingested information and corresponding to each of the plurality of categories; and
    one or more permissible use fields indicating a portion of the first subset of ingested information that requires authentication to receive access to the portion.

15. The method of claim 9, further comprising storing the multi-layered ingestion program to memory of the computing platform.

16. One or more non-transitory computer-readable media storing instructions that, when executed by a computing platform comprising at least one processor, a communication interface, and memory, cause the computing platform to:
  generate a multi-layered ingestion program configured to automatically ingest information from an information management system to a central information repository;
  receive a query requesting ingestion of information, from the information management system and to the central information repository, wherein the central information repository is remote from the computing platform;
  automatically generate, using the multi-layered ingestion program and based on the query, a plurality of executable scripts, wherein each executable script of the plurality of executable scripts corresponds to a layer of the multi-layered ingestion program, wherein the plurality of executable scripts comprises:
    at least one script corresponding to a first layer of the multi-layered ingestion program, and
    a plurality of scripts corresponding to a second layer of the multi-layered ingestion program,
  identify, by automatically executing the at least one script corresponding to the first layer, a first subset of information stored in the information management system, wherein the first subset of information stored in the information management system comprises information marked for ingestion to the central information repository; and execute the plurality of scripts corresponding to the second layer to ingest the first subset of information, wherein executing the plurality of scripts corresponding to the second layer causes the computing platform to:

deploy a schedule management program for the second layer; and transfer, using the schedule management program, the first subset of ingested information stored in the information management system to a third layer, wherein transferring the first subset of ingested information to the third layer comprises:

initially transferring the first subset of ingested information to a stage sublayer of the third layer, wherein the stage sublayer comprises memory that stores the first subset of ingested information in a first format;

merging the stage sublayer with a secure sublayer of the third layer, wherein the secure sublayer comprises a structured query language layer of the central information repository that stores the first subset of ingested information in the first format and in a second format; and causing, based on the merging, synchronization of the central information repository with the third layer.

17. The one or more non-transitory computer-readable media of claim 16, wherein initially transferring the first subset of ingested information to the stage sublayer comprises:

causing, by automatically executing a first script of the plurality of scripts corresponding to the second layer, execution of a shell script corresponding to the first script;

translating, by executing the shell script, the first subset of ingested information into a transferable format; and storing the translated first subset of ingested information in the stage sublayer of the third layer of the multi-layered ingestion program.

18. The one or more non-transitory computer-readable media of claim 16, storing further instructions that, when executed by a computing platform comprising at least one processor, a communication interface, and memory, cause the computing platform to:

store, prior to transferring the first subset of ingested information to the third layer, the first subset of ingested information to a view sublayer of the third layer of the multi-layered ingestion program, wherein the view sublayer is configured to, based on an authenticated view request, facilitate display of the first subset of ingested information; and cause, based on the authenticated view request and via the view sublayer, display of the first subset of ingested information.

19. The one or more non-transitory computer-readable media of claim 18, wherein the causing display of the first subset of ingested information comprises:

executing, based on the storing, at least one script, of the plurality of executable scripts, corresponding to the third layer of the multi-layered ingestion program; and caching, by executing the at least one script corresponding to the third layer, one or more portions of the first subset of ingested information.

20. The computing platform of claim 1, wherein the central information repository comprises a data lake.

* * * * *